United States Patent
Kim et al.

(10) Patent No.: US 6,785,544 B2
(45) Date of Patent: Aug. 31, 2004

(54) CALL PROCESSING METHOD CAPABLE OF HOME-ZONE ADDITIONAL SERVICES IN MOBILE COMMUNICATION SYSTEM

(75) Inventors: Wan-Tae Kim, Seoul (KR); Jung-Yul Park, Seoul (KR); Dong-Soo Ban, Seoul (KR); Jung-Eun Choi, Seoul (KR); Keun-Chool Yoo, Seoul (KR)

(73) Assignee: Hyundai Electronics Industries, Kyoungki-do (KR)

( * ) Notice: Subject to any disclaimer, the term of this patent is extended or adjusted under 35 U.S.C. 154(b) by 534 days.

(21) Appl. No.: 09/846,946

(22) Filed: May 1, 2001

(65) Prior Publication Data

US 2002/0128012 A1 Sep. 12, 2002

(30) Foreign Application Priority Data

Jun. 22, 2000 (KR) ........................................ 2000-34536
Jun. 22, 2000 (KR) ........................................ 2000-34542

(51) Int. Cl.[7] .............................................. H04Q 7/20
(52) U.S. Cl. ................... 455/433; 455/422.1; 455/445; 455/435.1; 455/432.1; 455/408; 455/456.1
(58) Field of Search ................. 455/445, 433, 455/405, 406, 407, 408, 422.1, 422–425, 446, 428, 560, 432.1, 456.1

(56) References Cited

U.S. PATENT DOCUMENTS

| | | | |
|---|---|---|---|
| 5,095,531 A | | 3/1992 | Ito ............................... 455/33 |
| 5,623,534 A | * | 4/1997 | Desai et al. ................. 455/445 |
| 6,018,573 A | | 1/2000 | Tanaka ........................ 379/211 |
| 6,026,298 A | | 2/2000 | Lamb et al. ................. 455/433 |
| 6,038,442 A | | 3/2000 | Ueda et al. .................. 455/414 |
| 6,044,261 A | | 3/2000 | Kazmi ......................... 455/408 |
| 6,085,083 A | | 7/2000 | Lamb .......................... 455/410 |
| 6,112,079 A | | 8/2000 | Lamb .......................... 455/411 |
| 6,157,831 A | | 12/2000 | Lamb .......................... 455/433 |
| 6,230,017 B1 | * | 5/2001 | Andersson et al. ....... 455/456.6 |
| 6,330,324 B1 | * | 12/2001 | Sabinson et al. ...... 379/221.08 |
| 6,424,832 B1 | * | 7/2002 | Britt et al. .................. 455/445 |
| 6,510,323 B1 | * | 1/2003 | Stocker et al. .............. 455/466 |

* cited by examiner

Primary Examiner—Erika Gary
Assistant Examiner—Kamran Afshar
(74) Attorney, Agent, or Firm—Baker Botts LLP

(57) ABSTRACT

A call processing method capable of home-zone additional service in a mobile communication system, in particular, which gives subscribers a discount in accounting without an additional equipment if the subscribers call within previously registered areas. According to the call processing method capable of home-zone additional service in the mobile communication service of the invention, the subscriber can be provided with the home-zone additional service with low cost, thereby enhancing customer satisfaction.

5 Claims, 3 Drawing Sheets

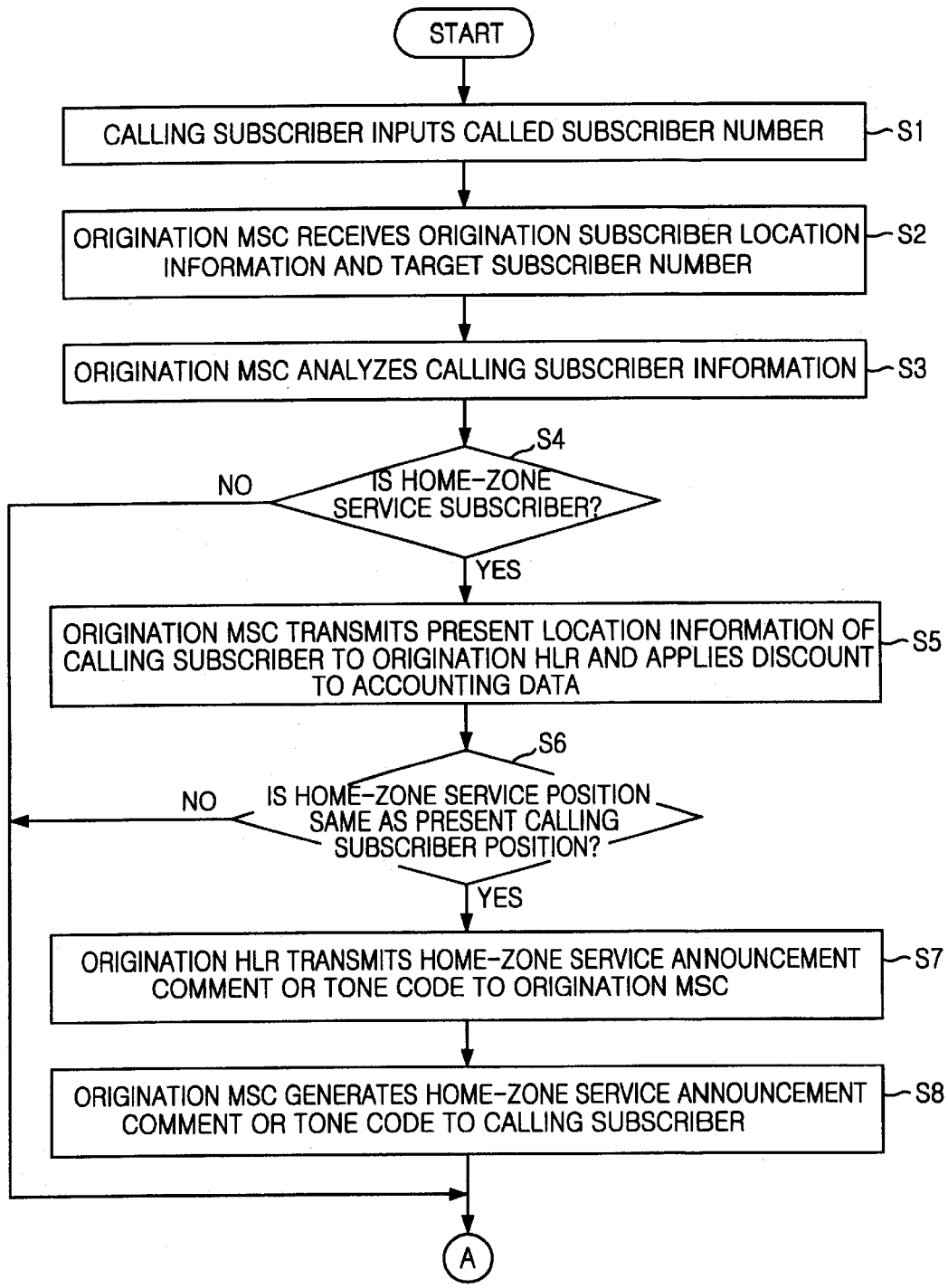

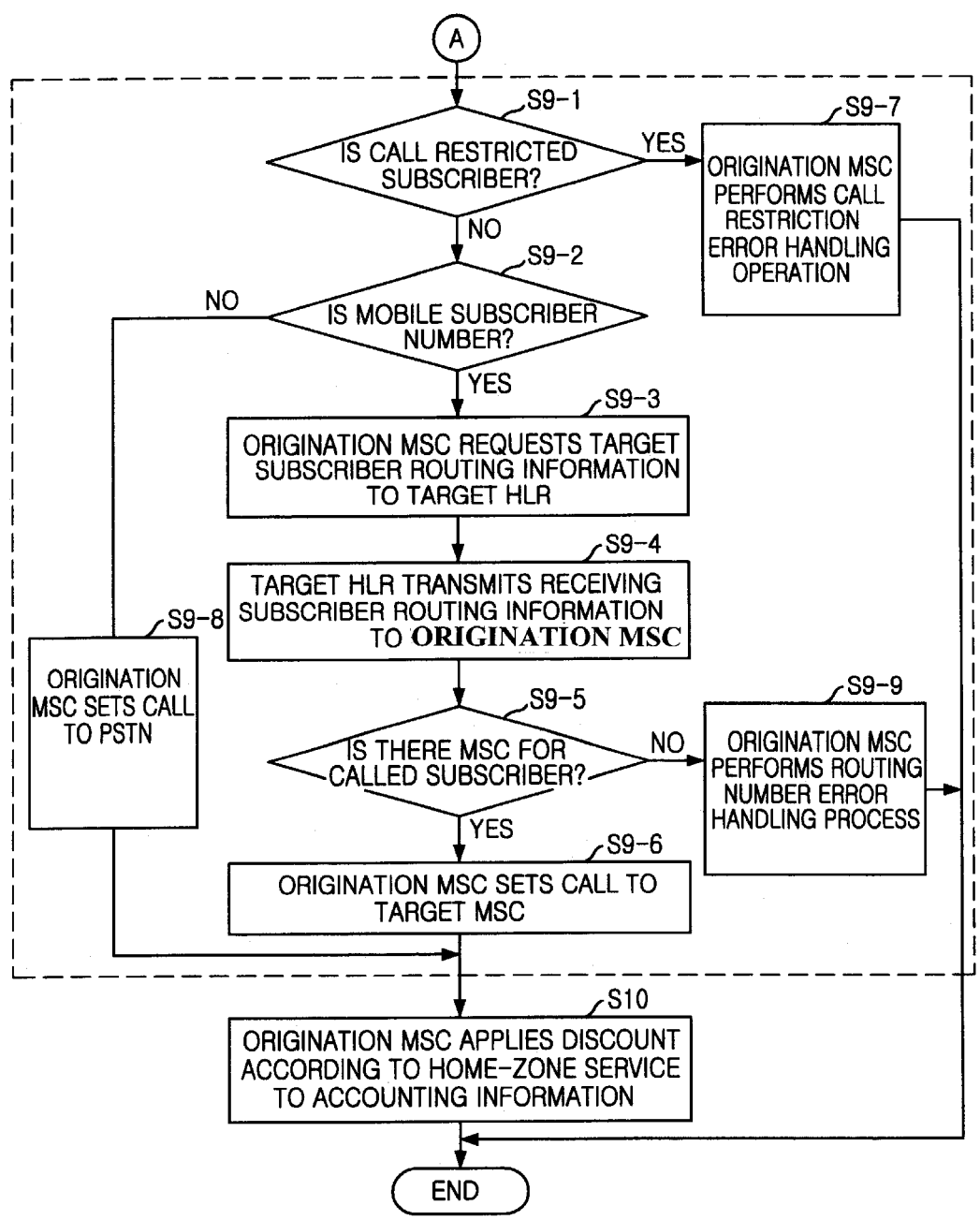

CALL PROCESSING METHOD CAPABLE OF HOME-ZONE ADDITIONAL SERVICES IN MOBILE COMMUNICATION SYSTEM

FIELD OF THE INVENTION

The present invention relates to a call processing method capable of home-zone additional service in a mobile communication system, in particular, which gives subscribers discount in accounting with an additional equipment for the home-zone additional service if the subscribers call from previously registered specific locations.

PRIOR ART OF THE INVENTION

As well known in the art, it is urgent for communication service providers such as existing DCS (Digital Cellular Service) providers or PCS (Personal Communication Service) providers to develop characteristic additional services as the communication service providers are competing excessively to ensure more subscribers.

In particular, as the service providers are developing various accounting systems according to call features of the subscribers to attract the subscribers, only those who develop and utilize various additional services will survive in the struggle for existence.

One of the additional services is a home-zone additional service which gives the subscribers a discount in charging when the subscribers call within a previously registered locations.

The home-zone additional service has been developed with additional equipments, e.g., a service control point (SCP), thereby needing a lot of cost in providing the home-zone additional service.

Therefore, it is necessary a method for providing the home-zone additional service to subscribers with low cost, in order to make the subscribers satisfied.

SUMMARY OF THE INVENTION

It is, therefore, an object of the invention to provide a call processing method capable of home-zone additional service in a mobile communication system without additional developing equipment.

In accordance with an aspect of the present invention, there is provided a call processing method in a mobile communication system which includes a origination MSC, a origination VLR, a origination HLR, a target MSC and a target HLR, the method comprising the steps of: a) receiving a number of the called subscriber from a calling subscriber; b) in the origination MSC, receiving location information and the number of called subscriber; c) in the origination MSC, reading and analyzing the calling subscriber information stored in the origination VLR; d) in the origination MSC, determining whether the calling subscriber is a home-zone service subscriber; e) if the calling subscriber is a home-zone service subscriber, transmitting present location information of the calling subscriber to the origination HLR, from the origination MSC; f) in the origination HLR, determining whether the present location of the calling subscriber is within a pre-registered area; g) if the calling subscriber is within the pre-registered area, applying in the origination MSC a discount in accounting according to home-zone service to the accounting information; and h) in the origination MSC, performing a call setup operation in order to allow conversation between the calling subscriber and the called subscriber.

BRIEF DESCRIPTION OF THE DRAWINGS

The above and other objects, features and advantages of the present invention will be more clearly understood from the following detailed description taken in conjunction with the accompanying drawings, in which:

FIGS. 2A and 2B are operational flow charts for showing a call processing method capable of home-zone additional service in the mobile communication system according to the embodiment of the invention.

PREFERRED EMBODIMENTS OF THE INVENTION

Figure 1:
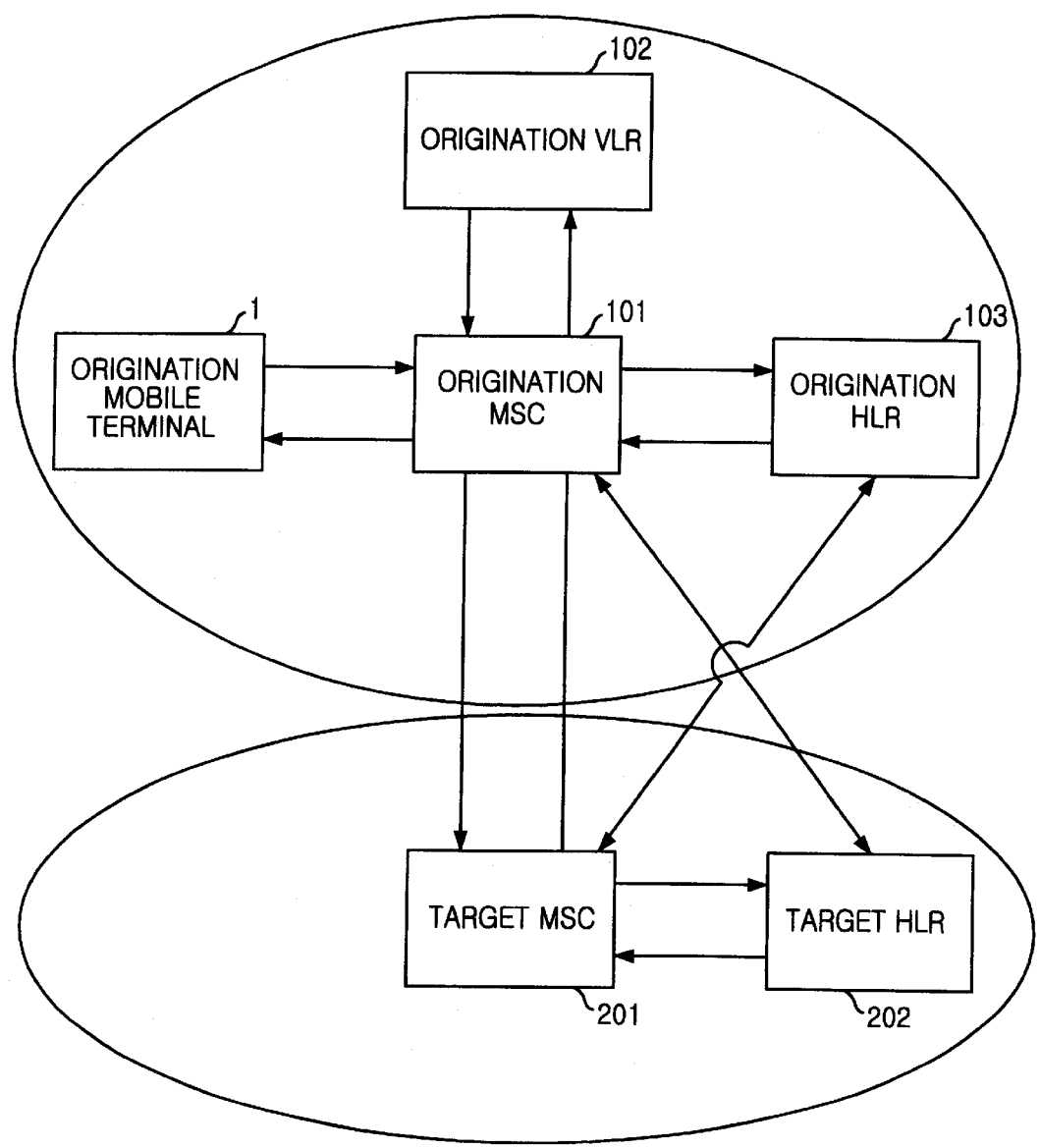
FIG. 1 is a functional block diagram for showing the construction of a call processing apparatus capable of home-zone additional service in a mobile communication system according to an embodiment of the invention.

Hereinafter, it will be described in detail about a call processing method capable of home-zone additional service in a mobile communication system according to a preferred embodiment of the present invention in reference to the appended drawings.

FIG. 1 is a functional block diagram for showing the construction of a call processing apparatus capable of home-zone additional service in a mobile communication system according to an embodiment of the invention, in which the call processing apparatus capable of home-zone additional service in a mobile communication system according to the embodiment of the invention is comprised of a origination MSC (Mobile Switching Center) 101, a origination VLR (Visitor Location Register) 102, a origination HLR(Home Location Register) 103, a target MSC and a target HLR 202.

The origination MSC 101 manages a specific location or location for home-zone service registered by a calling subscriber. The origination MSC 101 provides a home-zone service the calling subscriber if he/she calls at the specific location for home-zone service, and call connects the calling subscriber to a called subscriber via the target MSC 201 if the calling subscriber is a mobile subscriber. Also, the origination MSC 101 call connects the calling subscriber to the called subscriber via a PSTN (Public Subscriber Telecommunication Network) if the calling subscriber is interlocked with a general wire communication subscriber or another service provider.

The origination VLR 102 is connected to the origination MSC 101 to store and manage information for the calling subscriber.

The origination HLR 103 stores and manages specific location information for home-zone service registered by the calling subscriber and subscriber routing information. When receiving location information of the calling subscriber from the origination MSC 101, the origination HLR 103, compares if the pre-registered specific location for home-zone service is the same present location of the calling subscriber, and transmits an announcement comment and a tone code to the origination MSC 101 if proved the same as a result of the comparison.

Meanwhile, the target MSC 201 is an MSC for managing a location where the called subscriber is located if the called subscriber is a mobile subscriber, and has the same functions as the origination MSC 101.

Also, the target HLR 202 has the same functions as the origination HLR 102, and serves to perform an operation of processing a routing information request received from the origination MSC 101 while storing routing information about the called subscriber.

Now it will be described about a call processing method capable of home-zone additional service in the mobile communication system according to the embodiment of the invention by using the call processing apparatus capable of home-zone additional service in the mobile communication system constructed as above.

FIGS. 2A and 2B are flow charts for showing a call processing method capable of home-zone additional service in the mobile communication system according to the embodiment of the invention.

In step S1, a calling subscriber inputs a number of a called subscriber via the mobile station 1.

In step S2, the origination MSC 101 receives location information of the calling subscriber and the number of the called subscriber transmitted from the mobile station 1 via a base transceiver station and a base station controller.

Then, the origination MSC 101 analyzes the calling subscriber information stored in the origination VLR 102 while reading the same in step S3, and determines if the calling subscriber is a home-zone service subscriber in step S4.

Here, if the calling subscriber is determined as a home-zone service in step S4, the origination MSC 101 applies a discount according to home-zone service to accounting data while transmitting the present location information of the calling subscriber to the origination HLR 103 in step S5.

Then, the origination HLR 103 determines if the present location of the calling subscriber is within a pre-registered area by the home-zone service subscriber in step S6. At this time, one or more areas can be pre-registered in accordance with design of systems.

If it is determined whether the present location of the subscriber is within the pre-registered area (it is determined YES) in step S6, the origination HLR 103 transmits the announcement comment or the tone code for home-zone service to the origination MSC 101 in step S7.

Then, the origination MSC 101 transmits the announcement comment and/or the tone code for home-zone service to the mobile station 1 of the calling subscriber as soon as receiving from the origination HLR 103 to provide the announcement comment or the tone code for home-zone service to the calling subscriber in step S8. Here, the announcement comment for home-zone service outputted via the mobile station 1 includes a statement such as "A discount is given in this location."

Meanwhile, if it is determined that the calling subscriber is not a home-zone service subscriber (it is determined NO) in step S4, if it is determined that the specific location for home-zone service pre-registered by the calling subscriber is not same as the present location of the subscriber (it is determined NO) in step S6, or after step S8, the origination MSC 101 carries out a call setting operation between the calling subscriber and the receiving subscriber allowing the calling subscriber and the called subscriber to proceed a conversation between them in step S9.

Then, the origination MSC 101 applies a discount in accounting according to home-zone additional service to the accounting information.

Hereinafter it will be described in detail about detailed operational steps of step S9.

First in step S9-1, the origination MSC 101 determines if the calling subscriber is a restricted subscriber through the information analysis of the calling subscriber performed in step S3.

Here, if it is determined that the calling subscriber is not the restricted subscriber (it is determined NO), the origination MSC 101 determines if the number inputted by the calling subscriber is a number of a mobile network subscriber in step S9-2.

If it is determined that the inputted number is the number of the mobile network subscriber (it is determined YES), the origination MSC 101 requests the routing information about the called subscriber to the target HLR 202 in step S9-3.

Then in step S9-4, the target HLR 202 transmits the routing information about the called subscriber to the origination MSC 101 in step S9-4.

Meanwhile, the origination MSC 101, after analyzing the routing information about the called subscriber, determines if there exists a target MSC 201 to which the called subscriber belongs in step S9-5.

Here, if it is determined that the target MSC 201 for the called subscriber exists (it is determined YES), the origination MSC 101 sets up a call to the target MSC 201 allowing the calling subscriber and the called subscriber to proceed a conversation between in step S9-6, and then step S10 is followed.

Meanwhile, if it is determined that the calling subscriber is the restricted subscriber (it is determined YES), the origination MSC 101 performs a call restriction error handling operation in S9-7.

Also, if it is determined that the number inputted by the calling subscriber is not a mobile network subscriber number but a number of a general wire communication subscriber or a subscriber interlocked (it is determined NO), the origination MSC 101 sets up a call to the PSTN allowing the calling subscriber and the called subscriber to proceed a conversation in S9-8, and then step S10 is followed.

Meanwhile, if it is determined that the origination MSC 201 for the called subscriber does not exist (it is determined NO) in step S9-5, the origination MSC 101 performs a routing number error handling operation in S9-9, and then the call processing operation is ended.

According to the call processing method capable of home-zone additional service in the mobile communication service of the invention, the subscriber can be provided with a mobile communication service of high quality by providing the subscriber with the home-zone additional service thereby to have an excellent effect of enhancing customer satisfaction.

What is claimed is:

1. A call processing method in a mobile communication system which includes an origination MSC, an origination VLR, an origination HLR, a target MSC and a target HLR, the method comprising the steps of:
   a) receiving a number of the called subscriber from a calling subscriber;
   b) in the origination MSC, receiving location information and the number of called subscriber;
   c) in the origination MSC, reading and analyzing the calling subscriber information stored in the origination VLR;
   d) in the origination MSC, determining whether the calling subscriber is a home-zone service subscriber;
   e) if the calling subscriber is a home-zone service subscriber, transmitting present location information of the calling subscriber to the origination HLR, from the origination MSC;
   f) in the origination HLR, determining whether the present location of the calling subscriber is within a pre-registered area;
   g) if the calling subscriber is within the pre-registered area, applying the origination MSC a discount in accounting according to home-zone service to the accounting information;

h) in the origination MSC, performing a call setup operation in order to allow conversation between the calling subscriber and the called subscriber, i) if the present location of the calling subscriber is within a pre-registered area transmitting from the origination HLR announcement comment for the home-zone service or a tone code to the mobile station; and j) if the calling subscriber is not a home-zone subscriber or the present location of the calling subscriber is not pre-registered area, in the origination MSC, a call setup operation in order to allow conversation between the calling subscriber and the called subscriber without discount, wherein the step j) includes the steps of:

j1) determining in the origination MSC if the calling subscriber is call restricted subscriber;

j2) if it is determined that the calling subscriber is not a call restricted subscriber, determining in the origination MSC if the number of the called subscriber inputted by the calling subscriber is a mobile subscriber number;

j3) if the number of the called subscriber inputted by the calling subscriber is a mobile subscriber number, at the origination MSC, requesting the routing information about the called subscriber from the target HLR;

j4) transmitting from the target HLR the routing information about the called subscriber to the origination MSC;

j5) upon analyzing the routing information about the called subscriber, determining in the origination MSC whether the target MSC exists to which the called subscriber belongs; and j6) if it is determined that the target MSC for the called subscriber exists, setting up in the origination MSC a call to the target MSC allowing the calling subscriber and the called subscriber to proceed a conversation between them.

2. The call processing method as recited in claim 1, wherein the step i) includes the steps of:

i1) if the present location of the calling subscriber is within a pre-registered area, transmitting announcement comment for the home-zone service or a tone code from the origination HLR to the origination MSC; and i2) transmitting the announcement comment for the home-zone service or a tone code from the origination MSC to the mobile station.

3. The call method as recited in claim 1, if it is determined that the calling subscriber is a call restricted subscriber, performing in the origination MSC a call restricting error handling operation to end the call processing operation.

4. The call processing method as recited in claim 3, if it is determined that the called number inputted by the calling subscriber is not a mobile subscriber, setting up in the origination MSC a call to a PSTN allowing the calling subscriber and the called subscriber to proceed a conversation between them.

5. The call processing method as recited in claim 1, further including the step of performing in the origination MSC a routing number error handling operation to end the call processing operation, if it is determined that the target MSC for the called subscriber does not exist.

* * * * *